US010119599B2

(12) United States Patent
Fischer et al.

(10) Patent No.: US 10,119,599 B2
(45) Date of Patent: Nov. 6, 2018

(54) SPINDLE DRIVE FOR AN ADJUSTING ELEMENT OF A MOTOR VEHICLE

(71) Applicant: Brose Fahrzeugteile GmbH & Co. KG, Hallstadt, Hallstadt (DE)

(72) Inventors: Uwe Fischer, Sonneberg (DE); Christian Saxstetter, Doerfles-Esbach (DE)

(73) Assignee: Brose Fahrzeugteile GmbH & Co. KG, Hallstadt, Hallstadt (DE)

(*) Notice: Subject to any disclaimer, the term of this patent is extended or adjusted under 35 U.S.C. 154(b) by 538 days.

(21) Appl. No.: 14/772,934

(22) PCT Filed: Mar. 6, 2014

(86) PCT No.: PCT/EP2014/054374
§ 371 (c)(1),
(2) Date: Jan. 13, 2016

(87) PCT Pub. No.: WO2014/135646
PCT Pub. Date: Sep. 12, 2014

(65) Prior Publication Data
US 2016/0153532 A1   Jun. 2, 2016

(30) Foreign Application Priority Data

Mar. 7, 2013   (DE) .................. 10 2013 003 830

(51) Int. Cl.
*F16H 25/20*   (2006.01)
*E05F 15/611*   (2015.01)
(Continued)

(52) U.S. Cl.
CPC .............. *F16H 25/20* (2013.01); *B60J 5/101* (2013.01); *E05F 15/611* (2015.01);
(Continued)

(58) Field of Classification Search
CPC .... B60G 7/005; B60G 2204/416; B60J 5/101; B62D 7/16; B62D 7/166; E05F 15/611;
(Continued)

(56) References Cited

U.S. PATENT DOCUMENTS 4,137,784 A * 2/1979 Griffin .................. B66F 3/08
74/89.37
6,067,868 A  5/2000 Takashi et al.
(Continued)

FOREIGN PATENT DOCUMENTS

DE   3801904   8/1989
DE   3824867   10/1989
(Continued)

OTHER PUBLICATIONS

"German Search Report," for German Patent Application No. 102013003830.8, related to U.S. Appl. No. 14/772,934 dated Aug. 2, 2013 (5 pages).
(Continued)

*Primary Examiner* — Victor L MacArthur
(74) *Attorney, Agent, or Firm* — Pauly, DeVries Smith & Deffner LLC

(57) ABSTRACT

Disclosed herein is a spindle drive for an adjustable element of a motor vehicle, wherein a drive unit and a spindle/spindle nut mechanism arranged downstream of the drive unit in the drivetrain, for generating linear drive movements are provided, wherein the spindle/spindle nut mechanism has a spindle and a spindle nut meshing with the spindle, wherein the spindle drive has two drive portions which run telescopically inside one another during a motorized adjustment, wherein the spindle is assigned to one drive portion and the spindle nut is assigned to the other drive portion wherein the two drive portions are coupled in a torque-transmitting manner to provide an antitwist safeguard.

18 Claims, 3 Drawing Sheets

(51) Int. Cl.
  *B60J 5/10*   (2006.01)
  *E05F 15/622* (2015.01)
(52) U.S. Cl.
  CPC ....... *E05F 15/622* (2015.01); *E05Y 2900/546* (2013.01); *F16H 2025/204* (2013.01)
(58) Field of Classification Search
  CPC .. E05F 15/622; E05Y 2900/546; F16H 25/20; F16H 2025/204
  See application file for complete search history.

(56) References Cited

U.S. PATENT DOCUMENTS

| | | | |
|---|---|---|---|
| 9,097,056 B2 | 8/2015 | Kummer et al. | |
| 9,103,153 B2* | 8/2015 | Fahl | E05F 15/622 |
| 9,765,809 B2* | 9/2017 | Fischer | F16C 11/06 |
| 2007/0062119 A1* | 3/2007 | Ritter | F16H 25/20 49/343 |
| 2011/0290050 A1* | 12/2011 | Kummer | E05F 15/622 74/89.23 |
| 2014/0270912 A1* | 9/2014 | Fischer | F16C 11/06 403/134 |
| 2015/0240547 A1* | 8/2015 | Fischer | F16H 25/20 74/89.4 |

FOREIGN PATENT DOCUMENTS

| | | |
|---|---|---|
| DE | 202005000559 | 1/2006 |
| DE | 102006027523 | 1/2008 |
| DE | 102007043391 | 3/2009 |
| DE | 102010053226 | 6/2012 |
| DE | 102013003830 | 9/2014 |
| JP | 06061543 | 8/1994 |
| JP | 06321013 | 11/1994 |
| WO | 2014135646 | 9/2014 |

OTHER PUBLICATIONS

"International Search Report & Written Opinion," for PCT Application No. PCT/EP2014/054374, related to U.S. Appl. No. 14/772,934 dated May 30, 2014 (9 pages).

"Handbook of Jig and Fixture Design", Library of Congress Catalog No. 89-62218, Society of Manufacturing Engineers, 1989 (5 pages).

* cited by examiner

SPINDLE DRIVE FOR AN ADJUSTING ELEMENT OF A MOTOR VEHICLE

CROSS-REFERENCE TO RELATED APPLICATIONS

This application is a national stage application under 35 U.S.C. 371 of International Patent Application Serial No. PCT/EP2014/054374, entitled "Spindelantrieb fur ein Verstellelement eines Kraftfahrzeugs," filed Mar. 6, 2014, which claims priority from German Patent Application No. DE 10 2013 003 830.8, filed Mar. 7, 2013, the disclosures of which are incorporated herein by reference.

FIELD OF THE INVENTION

The present invention relates to a spindle drive for an adjustable element of a motor vehicle and a corresponding spindle drive.

BACKGROUND

The expression "adjustable element" in the present case is to be understood in broad terms. It comprises for example a tailgate, a rear cover, an engine hood, a side door, a loading compartment flap, a lifting roof or the like of a motor vehicle. The application region of the motorized adjustment of a tailgate of a motor vehicle is the main focus in the text which follows. This must not be understood to be limiting.

Spindle drives have proven themselves in recent years in the context of the motorized actuation of tailgates. The main focus in the present case is a high degree of compactness and a low weight.

The known spindle drive (DE 20 2005 000 559 U1), on which the invention is based, has in the conventional manner two drive portions of which one drive portion is assigned a spindle and the other drive portion is assigned a spindle nut meshing with the spindle.

The two drive portions are in each case assigned a connection for channeling out the linear drive movements. In order not to subject the connections to a rotation about the geometric spindle axis, the two drive portions are safeguarded against twisting with respect to one another.

In the case of the known spindle drive, the spindle nut is connected via a spindle nut tube to the spindle nut-side connection. An outer housing tube extends in the direction of the spindle-side connection from the spindle nut-side connection. Starting from the spindle-side connection, a housing tube in turn extends in the direction of the spindle nut-side connection in such a way that the spindle-side housing tube runs in the spindle nut-side housing tube.

In the case of the known spindle drive, the antitwist safeguard is integrated into the housing consisting of the two housing tubes. Specifically, the two housing tubes are coupled to one another in a torque-transmitting manner to provide antitwist safeguarding. This is achieved for example by a tongue and groove coupling.

A disadvantage with the known spindle drive is the fact that a weight-reducing design of the housing is possible only within narrow limits because of the loading associated with the antitwist safeguard.

SUMMARY

The problem underlying the invention is to configure and develop the known spindle drive in such a way that the constructional limitations concerning the housing are reduced without the functional scope of the spindle drive being adversely affected.

The above problem is solved with a spindle drive as described herein.

It is essential firstly in structural terms that there is provided a guide tube which is assigned to the spindle-side drive portion and in which the spindle nut is guided together with the spindle nut tube.

It is essential further that the engagement between the spindle nut or the spindle nut tube and the guide tube is used in order to ensure the above-discussed antitwist safeguarding between the two drive portions. For this purpose, as seen in cross section, at least one shaped portion in the inner region of the guide tube with an assigned mating shaped portion in the outer region of the spindle nut and/or of the spindle nut tube is provided.

As a result of the proposed shifting of the antitwist safeguard to the inside, the antitwist safeguard must apply corresponding high forces. In the case of a tongue and groove connection, this would lead to correspondingly high shear forces transverse with respect to the extent of the groove. This is where a third aspect of the proposed solution comes in. Specifically, it is the case that the two mutually assigned shaped portions for torque transmission in an antitwist-safeguarding manner interact in a wedge-like manner with the formation of a radial force component. This means that the antitwist safeguarding is based on a support of torques via wedge surfaces. Shear forces which, in the extreme case, could lead to a destruction of a tongue and groove connection do not occur at all or only to a slight extent with the proposed solution. The forces required for the support are "rechanneled" into radial forces at least to a significant extent via the wedge surfaces.

The expression "wedge-like interaction" in the present case is to be understood in broad terms. By this it is meant that the support of the torques is performed via a surface which is shaped in any way and implements at least part of the support based on a radial force component. This surface in the broadest sense is a wedge surface insofar as a corresponding rechanneling of forces is performed in a wedge-like manner in the above sense.

It should be pointed out that the expressions "radial" and "tangential" always refer to the geometric spindle axis. The expression "cross section" in the present case always means the cross section transverse to the spindle axis.

In an embodiment, by virtue of the mutually complementary configuration of the guide tube-side shaped portion and the assigned spindle nut-side mating shaped portion, a positive inter-engagement of the two shaped portions has been achieved, which leads to a particularly uniform force distribution in the support of torques.

In an embodiment, the shaped portions in question are designed to be curved at least in part. This makes it possible to reduce undesired notch effects with little outlay.

In an embodiment, it has been recognized that rectilinear radial force components can be taken up with constructionally simple means, so that the arrangement can be readily configured with shallow wedge angles.

In an embodiment, an extraordinarily stable structural design can be achieved by virtue of the fact that, as seen in cross section, the shaped portions form closed contours. Owing to the above-discussed shallow wedge angles, the space requirement for the antitwist safeguard in the radial direction is small, with the result that radial through-passages in particular in the guide tube can be dispensed with.

According to an embodiment, the spindle nut is designed as a plastic injection-molded part, wherein the spindle nut together with the spindle nut-side shaped portion for antitwist safeguarding is injection-molded into or onto the spindle nut tube by the plastic injection-molding process. The wedge-like interaction between the shaped portions in question does not necessarily matter here.

Rather, it is of interest in the further teaching that the spindle nut can be produced together with the spindle nut-side shaped portion in a particularly simple manner In this connection, particular emphasis should be given to the fact that a mounting step for the spindle nut or the spindle nut-side shaped portion is completely dispensed with. As for the rest, reference should be made to the statements regarding the spindle drive according to the first teaching.

In an embodiment, provided is a spindle drive for an adjustable element of a motor vehicle, wherein a drive unit and a spindle/spindle nut mechanism arranged downstream of the drive unit in the drivetrain, for generating linear drive movements are provided, wherein the spindle/spindle nut mechanism has a spindle and a spindle nut meshing with the spindle, wherein the spindle drive has two drive portions which run telescopically inside one another during a motorized adjustment, wherein the spindle is assigned to one drive portion and the spindle nut is assigned to the other drive portion wherein the two drive portions are coupled in a torque-transmitting manner to provide an antitwist safeguard, wherein during the motorized adjustment, the spindle nut runs along the spindle axis within a guide tube of the spindle-side drive portion and is safeguarded against twisting with respect to the guide tube, in that, as seen in cross section, at least one shaped portion within the guide tube is or can be brought into torque-transmitting engagement with an assigned mating shaped portion in the region of the spindle nut for antitwist safeguarding and the two mutually assigned shaped portions interact for this torque transmission in a wedge-like manner with the formation of a radial force component.

In an embodiment, the antitwist safeguard and the corresponding torque-transmitting engagement are provided in both directions of rotation.

In an embodiment, as seen in cross section, the guide tube-side shaped portion or the spindle nut-side mating shaped portion is of convex design, and in that correspondingly the spindle nut-side mating shaped portion or the guide tube-side shaped portion is of concave design.

In an embodiment, as seen in cross section, the guide tube-side shaped portion and/or the spindle nut-side mating shaped portion is or are designed to be curved at least in part.

In an embodiment, as seen in cross section, the guide tube-side shaped portions and/or the spindle nut-side mating shaped portions are designed to be flat in such a way that the resulting wedge angle is below 50° or below 45°.

In an embodiment, a plurality of guide tube-side shaped portions and a plurality of spindle nut-side shaped portions are provided.

In an embodiment, the guide tube-side shaped portions and/or the spindle nut-side mating shaped portions are arranged uniformly distributed about the spindle axis.

In an embodiment, as seen in cross section, the guide tube-side shaped portion and/or the spindle nut-side mating shaped portion is or are closed, such that, as seen in cross section, the guide tube-side shaped portion and/or the spindle nut-side mating shaped portion is or are a constituent part of an encircling, closed contour.

In an embodiment, two connections for channeling out the linear drive movements are provided, in that one connection is connected to the spindle-side drive portion and the other connection is connected to the spindle nut-side drive portion, in that the spindle nut is connected via a spindle nut tube to the spindle nut-side connection, and in that the spindle nut tube runs at least in part in the guide tube -of the spindle-side drive portion, such that the spindle nut is arranged in the spindle nut tube, such as at one end of the spindle nut tube.

In an embodiment, the spindle nut projects radially through at least one opening in the spindle nut tube, and in that the through-projecting part of the spindle nut provides at least a part of the spindle nut-side shaped portion for antitwist safeguarding, such as the part of the spindle nut projecting through the opening extends laterally beyond the edge of the opening.

In an embodiment, provided is a spindle drive for an adjustable element of a motor vehicle, wherein a drive unit and a spindle/spindle nut mechanism arranged downstream of the drive unit in the drivetrain, for generating linear drive movements are provided, wherein the spindle/spindle nut mechanism has a spindle and a spindle nut meshing with the spindle, wherein the spindle drive has two drive portions which run telescopically inside one another during a motorized adjustment, wherein the spindle is assigned to one drive portion and the spindle nut is assigned to the other drive portion wherein the two drive portions are coupled in a torque-transmitting manner to provide an antitwist safeguard, wherein during the motorized adjustment, the spindle nut runs along the spindle axis within a guide tube of the spindle-side drive portion and is safeguarded against twisting with respect to the guide tube, in that, as seen in cross section, at least one shaped portion within the guide tube is or can be brought into torque-transmitting engagement with an assigned mating shaped portion in the region of the spindle nut for antitwist safeguarding, in that the spindle nut is designed as a plastic injection-molded part, and in that the spindle nut and the spindle nut-side shaped portion for antitwist safeguarding are injection-molded into or onto the spindle nut tube by the plastic injection-molding process.

BRIEF DESCRIPTION OF THE FIGURES

The invention will be explained in more detail below with reference to a drawing illustrating merely one exemplary embodiment.

In the drawing.

DETAILED DESCRIPTION

Figure 1:
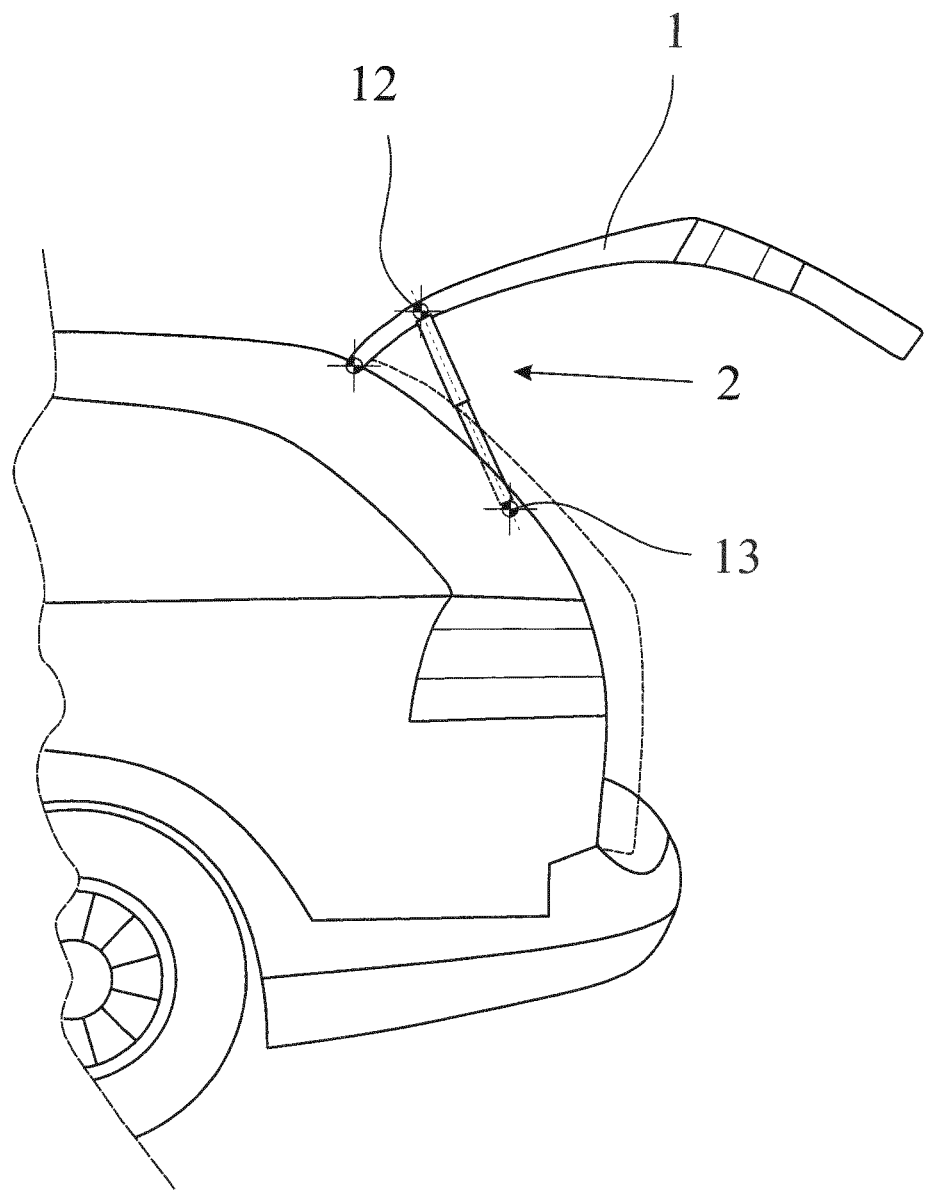
FIG. 1 shows, in a schematic side view, the rear of a motor vehicle with a proposed spindle drive.

The spindle drive illustrated in the drawing serves for the motorized adjustment of an adjustable element 1, configured as a tailgate, of a motor vehicle. Other application regions of the proposed spindle drive are conceivable, as will be explained further below in detail.

The spindle drive is equipped in a conventional manner with a drive unit 2 and a spindle/spindle nut mechanism 3, arranged downstream of the drive unit 2 in the drivetrain, for generating linear drive movements. In this case, the drive unit 2 has a tubular and in particular one-piece drive unit housing and therein a drive motor 5 and an intermediate transmission 6 arranged downstream of the drive motor 5 in the drivetrain. Depending on the design of the drive motor, it is also possible to dispense with an intermediate transmission 6.

A particularly slender design is obtained by the drive unit 2 and the spindle/spindle nut mechanism 3 being arranged behind one another on the geometric spindle axis 7.

It should be pointed out once again at this point that the expressions "radial" and "tangential" always refer to the geometric spindle axis 7 of the spindle/spindle nut mechanism 3. In order to provide a clear illustration, corresponding express references will be dispensed with in the following.

The spindle/spindle nut mechanism 3 is equipped in a conventional manner with a spindle 8 and a spindle nut 9, wherein the spindle nut 9 is in meshing engagement with the spindle 8.

The spindle drive has two drive portions 10, 11 which, during a motorized adjustment, run telescopically inside one another and are safeguarded against twisting with respect to one another, wherein the spindle 8 is assigned to the drive portion 10 and the spindle nut 9 is assigned to the drive portion 11.

Figure 2:
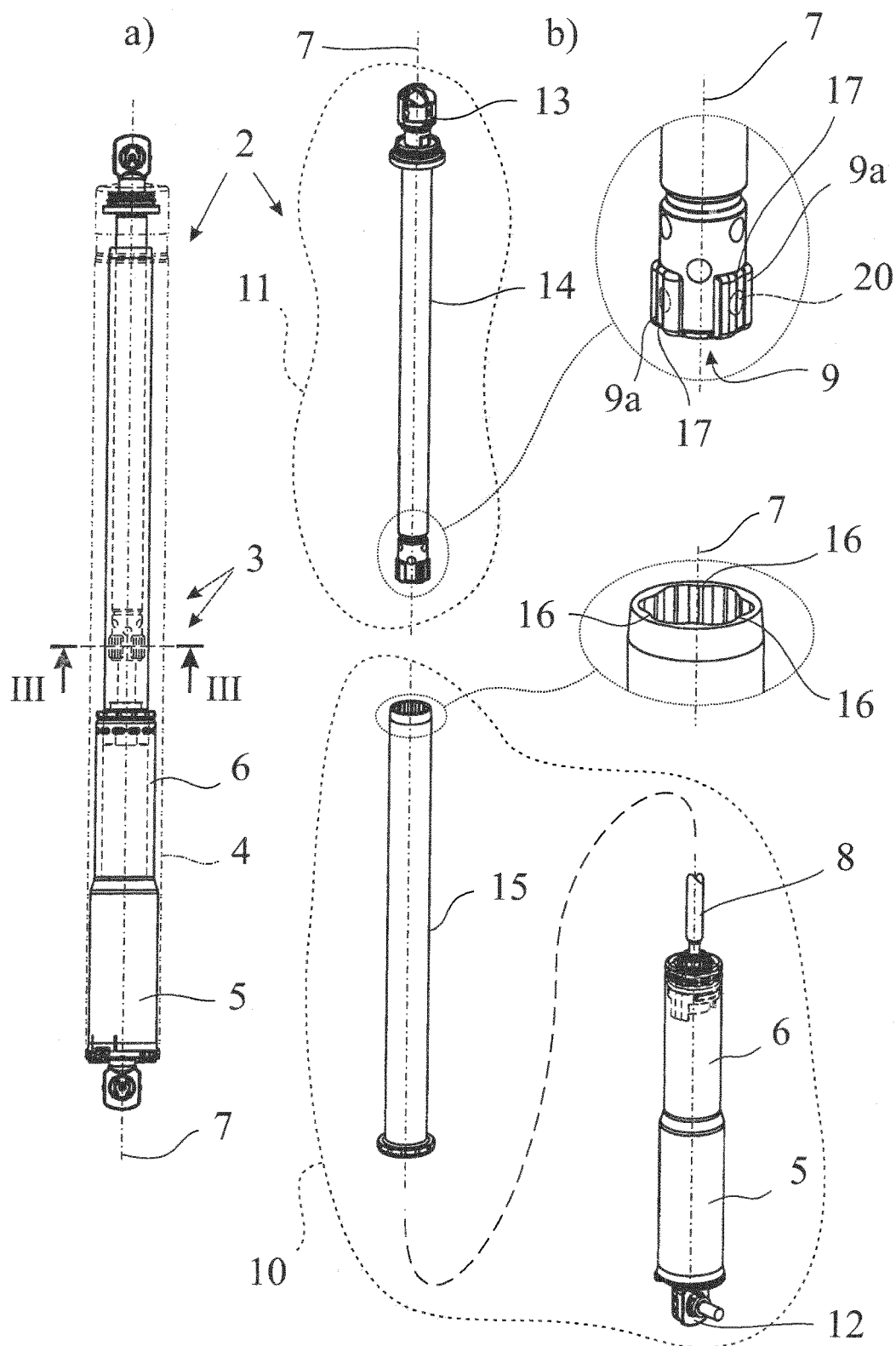
FIG. 2 shows the proposed spindle drive according to FIG. 1 a) in the assembled state and b) in the partially demounted state.

In order to channel out the linear drive movements, there are provided two connections 12, 13, of which one connection 12 is connected to the spindle, or spindle-side, drive portion 10 and the other connection 13 is connected to the spindle nut, or spindle nut-side, drive portion 11. FIG. 2b) shows that the spindle nut 9 is connected via a spindle nut tube 14 to the spindle nut-side connection 13.

It is essential first of all that the spindle nut 9 is guided together with the spindle nut tube 14 along the geometric spindle axis 7 in a guide tube 15 of the spindle-side drive portion 10, wherein an antitwist mechanism or safeguard is provided between the spindle nut 9 or spindle nut tube 14 and guide tube 15. Specifically, as seen in cross section transversely to the geometric spindle axis 7, at least one shaped portion 16 in the inner region of the guide tube 15 is in torque-transmitting engagement with an assigned mating shaped portion 17 in the outer region of the spindle nut 9, and also of the spindle nut tube 14, for antitwist safeguarding. Finally, the shaped portion 16 and the mating shaped portion 17 form a positive connection on which the antitwist mechanism (also referred to herein as the antitwist safeguard) is based. Here, a plurality of shaped portions 16 and mating shaped portions 17 are provided, as will be explained.

Of particular importance first of all is the fact that, as seen in cross section, in each case two mutually assigned shaped portions 16, 17 for the above torque transmission interact in a wedge-like manner and with the formation of a radial force component. It has already been pointed out that "in a wedge-like manner" means that a radial force component is involved in the support of any torques. For this purpose, the shaped portions 16, 17 are designed such that a wedge surface and, as a result, a wedge-like interaction are obtained. This can best be seen from the sectional illustration according to FIG. 3.

The proposed wedge-like interaction of the respectively assigned shaped portions 16, 17 leads, as explained further above, to a particularly compact and at the same time to a low-wear loading by the merely slight shear stresses in the tangential direction acting on the shaped portions 16, 17.

Figure 3:
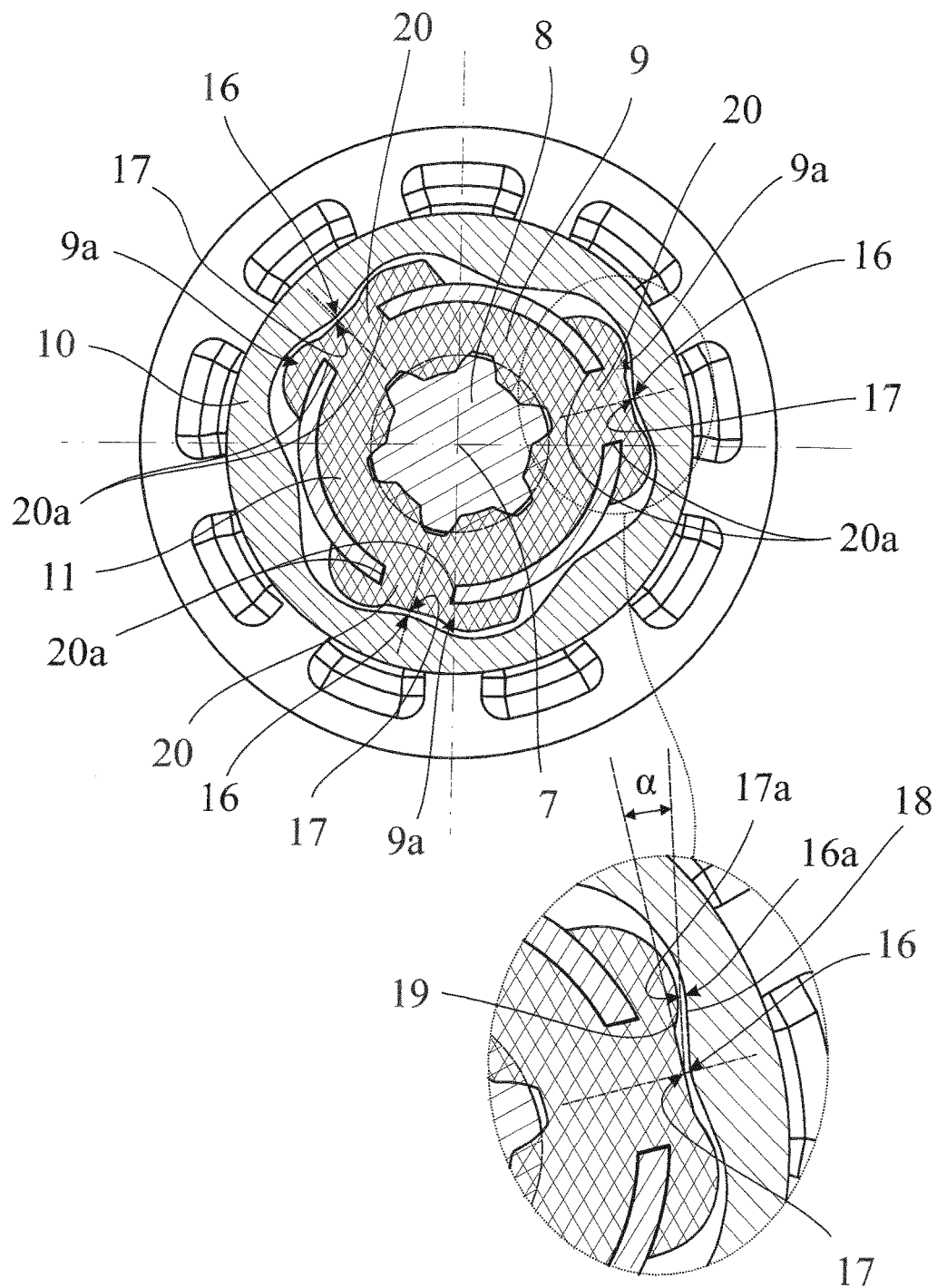
FIG. 3 shows the spindle drive according to FIG. 2a) in a side view along the section line III-III.

FIG. 3 shows the respective wedge surfaces 18, 19 for the shaped portions 16, 17. It is clear here that this is here not an ideal wedge arrangement with ideally shallow wedge surfaces 18, 19. Rather, what is involved in the present case is that a proposed wedge-like interaction between the shaped portions 16, 17 results from the geometry of the arrangement. Furthermore, it is clear here that, owing to the symmetry of the shaped portions 16, 17, the antitwist safeguard acts in both directions of rotation.

For a rotation of the spindle-side drive portion 10 with respect to the spindle nut-side drive portion 11 to the left in FIG. 3, a part 16a of the shaped portion 16 comes into engagement with a part 17a of the mating shaped portion 17. It can be seen from the illustration according to FIG. 3 that not only tangential support forces $F_t$ but also radial support forces $F_r$ occur here. The illustration according to FIG. 3 is also interesting insofar as the guide tube-side shaped portion 16 and the assigned spindle nut-side mating shaped portion 17 are designed to be complementary to one another, with the result that the two shaped portions 16, 17 substantially inter-engage in a positive manner. In the exemplary embodiment illustrated in FIG. 3, as seen in cross section, the contours formed by the assigned shaped portions 16, 17 are formed to be very similar at least in certain portions.

Specifically, it is the case here that the guide tube-side shaped portion 16 is designed to be convex and that correspondingly the spindle nut-side mating shaped portion 17 is designed to be concave. This arrangement is advantageous particularly in view of the limited wall thickness of the guide tube 15. However, in principle, it can also be provided that the guide tube-side shaped portion 16 is designed to be concave and that correspondingly the spindle nut-side mating shaped portion 17 is designed to be convex. The expressions "convex" and "concave" are to be understood in broad terms and are correspondingly not limited to a curved profile.

Of particular advantage in the exemplary embodiment illustrated in FIG. 3 is furthermore the fact that, as seen in cross section, the guide tube-side shaped portion 1 6 and the spindle nut-side mating shaped portion 17 are in each case is designed to be curved in part. This makes it possible to substantially reduce notch effects as discussed above. In principle, it is also conceivable that only one of the two shaped portions 16, 17 is designed to be correspondingly curved.

As proposed, the two mutually assigned shaped portions 16, 17 interact in a wedge-like manner, that is to say via the wedge slopes 18, 19 which form a wedge angle α. In an embodiment, as seen in cross section, the resulting wedge angle α is below 50° and in some embodiments below 45°. Specifically, the wedge angle α can be in a range between 30° and 35°. These small wedge angles can be achieved in that the guide tube-side shaped portion 16 and the spindle nut-side mating shaped portion 17 are in each case designed to be flat. However, in principle, it is also sufficient for achieving such a wedge angle α for only one of the two shaped portions 16, 17 to be designed to be flat.

In the present case, mention has been made almost continuously of merely one guide tube-side shaped portion 16 and merely one spindle nut-side mating shaped portion 17. However, FIG. 3 shows that a plurality of guide tube-side shaped portions 16 and a plurality of spindle nut-side mating shaped portions 17 are provided. All the statements relating to a single guide tube-side shaped portion 1 6 and a single spindle nut-side mating shaped portion 17 correspondingly apply to the plurality of shaped portions 16, 17.

In order to achieve uniform force distribution, it is the case in an embodiment that the guide tube-side shaped portion 16 and the spindle nut-side mating shaped portions 17 are arranged uniformly distributed about the geometric spindle axis 7. Accordingly, both the guide tube-side shaped portions and the spindle nut-side mating shaped portions 17 are spaced from one another by an angle of 120°.

The wedge-like interaction of the shaped portions 16, 17 makes it possible for through-passages in the guide tube 15 to be readily dispensed with. Accordingly, the shaped portions 16, 17 form a closed contour as seen in cross section. In an embodiment, as seen in cross section, the guide tube-side shaped portion 16 and the spindle nut-side mating shaped portion 17 are a constituent part of an encircling, closed contour. In principle, this can also apply only to one of the two shaped portions 16, 17.

In the embodiment illustrated, very particular importance can be attached to the design of the spindle nut 9. The spindle nut 9 can be arranged in the spindle nut tube 14, here at one end of the spindle nut tube 14. This ensures that the spindle drive can be moved apart as far as physically possible.

Of interest now is the fact that the spindle nut 9 projects radially through at least one opening 20 in the spindle nut tube 14 and that the through-projecting part 9a of the spindle nut 9 provides at least a part of the spindle nut-side mating shaped portion 17 for antitwist safeguarding. FIG. 3 further shows that the part 9a of the spindle nut 9 projecting radially through the opening 20 extends laterally, that is to say perpendicularly to a radial direction, beyond the edge 20a of the opening 20. This can best be achieved in that the spindle nut 9 is designed as a plastic injection-molded part and in that the spindle nut 9 together with the spindle nut-side mating shaped portion 17 for antitwist safeguarding is injection-molded into or onto the spindle nut tube 14 by the plastic injection-molding process. In this connection, it is conceivable for the spindle nut tube 14 to be placed in an injection mold and for the spindle nut 9 to be produced together with the spindle nut-side mating shaped portion 17 in a single injection-molding process.

In this connection, it is also conceivable for the spindle nut 9 on the one hand to be injection-molded from a first plastic material and for the at least one spindle nut-side mating shaped portion 17 on the other hand to be injection-molded from a second plastic material. In this case, the second plastic material can be softer than the first plastic material in order to improve the damping properties of the interaction of the two shaped portions 16, 17.

An above spindle drive having, as described, a spindle nut 9 arranged in the spindle nut tube 14 and produced by the plastic injection-molding process is the subject matter of a further teaching to which independent importance is attached. The realization of a wedge-like interaction of the shaped portions 16, 17 is not crucial according to this further teaching. As for the rest, reference should be made to all the above statements regarding the first teaching.

Finally, it should be pointed out that the guide tube 15 is formed from plastic in an embodiment. This is possible especially by virtue of the fact that, owing to the wedge-like interaction of the mutually assigned shaped portions 16, 17, a considerable part of the torques can be supported by a radial force component.

The invention claimed is:

1. A spindle drive for an adjustable element of a motor vehicle, the spindle drive comprising:
    a drive unit;
    a spindle nut mechanism arranged downstream of the drive unit in a drivetrain of the spindle drive, for generating linear drive movements, the spindle nut mechanism comprising a spindle and a spindle nut meshing with the spindle;
    a spindle drive portion and a nut drive portion that run telescopically inside one another during a motorized adjustment, the spindle drive portion comprising a guide tube; and
    an anti-twist mechanism comprising at least one first shaped portion within the guide tube and a corresponding at least one mating shaped portion in a region of the spindle nut;
    wherein during the motorized adjustment, the spindle nut runs along an axis of the spindle within the guide tube and is safeguarded against twisting with respect to the guide tube by the anti-twist mechanism; and
    wherein the spindle drive portion and the spindle nut drive portion are coupled in a torque-transmitting manner by the anti-twist mechanism, wherein the at least one first shaped portion is or can be brought into torque-transmitting engagement with the corresponding at least one mating shaped portion, wherein the at least one first shaped portion is inclined towards the corresponding at least one mating shaped portion, thereby forming a radial force component for supporting the torque-transmitting engagement.

2. The spindle drive as claimed in claim 1, wherein the anti-twist mechanism and the corresponding torque-transmitting engagement are provided in both directions of rotation.

3. The spindle drive as claimed in claim 1, wherein the at least one first shaped portion is of convex design and the corresponding at least one mating shaped portion is of concave design, or wherein the corresponding at least one mating shaped portion is of convex design and the at least one first shaped portion is of concave design.

4. The spindle drive as claimed in claim 1, wherein the at least one first shaped portion and/or the corresponding at least one mating shaped portion is or are designed to be curved at least in part.

5. The spindle drive as claimed in claim 1, wherein the at least one first shaped portion comprises a first wedge surface and the corresponding at least one mating portion comprises a second wedge surface, wherein the first wedge surface and the second wedge surface define a wedge angle, and wherein the torque-transmitting engagement comprises an interaction between the first wedge surface and the second wedge surface that forms the radial force component for supporting the torque-transmitting engagement.

6. The spindle drive as claimed in claim 5, wherein the at least one first shaped portion and/or the corresponding at least one mating shaped portion is or are designed to be flat such that the wedge angle is less than 50 degrees.

7. The spindle drive as claimed in claim 6, wherein the wedge angle is less than 45 degrees.

8. The spindle drive as claimed in claim 1, wherein the at least one first shaped portion comprises a plurality of first shaped portions and the corresponding at least one mating shaped portion comprises a corresponding plurality of mating shaped portions.

9. The spindle drive as claimed in claim 8, wherein the plurality of first shaped portions and/or the corresponding plurality of mating shaped portions are arranged uniformly about the spindle axis.

10. The spindle drive as claimed in claim 1, wherein the at least one first shaped portion and the corresponding at least one mating shaped portion are part of encircling, closed contours.

11. The spindle drive as claimed in claim 1, further comprising a spindle nut tube and first and second connections for channeling out the linear drive movements, wherein the first connection is connected to the spindle drive portion and the second connection is connected to the spindle nut drive portion, wherein the spindle nut is connected via the spindle nut tube to the second connection, and wherein the spindle nut tube runs at least in part in the guide tube of the spindle drive portion.

12. The spindle drive as claimed in claim 11, wherein the spindle nut projects radially through at least one opening in the spindle nut tube, and wherein a through-projecting part of the spindle nut provides at least a part of the corresponding at least one mating shaped portion for anti-twist safeguarding.

13. The spindle drive as claimed in claim 12, wherein the part of the spindle nut projecting through the opening extends laterally beyond the edge of the opening.

14. The spindle drive as claimed in claim 11, wherein the spindle nut is arranged in the spindle nut tube.

15. The spindle drive as claimed in claim 11, wherein the spindle nut is arranged in the spindle nut tube at one end of the spindle nut tube.

16. The spindle drive as claimed in claim 1, wherein the at least one first shaped portion or the corresponding at least one mating shaped portion is a constituent part of an encircling, closed contour.

17. A spindle drive for an adjustable element of a motor vehicle, the spindle drive comprising:
 a drive unit;
 a spindle nut mechanism arranged downstream of the drive unit in a drivetrain of the spindle drive, for generating linear drive movements, the spindle nut mechanism comprising a spindle and a spindle nut meshing with the spindle;
 a spindle drive portion and a nut drive portion that run telescopically inside one another during a motorized adjustment, the spindle drive portion comprising a guide tube; and
 an anti-twist mechanism comprising at least one first shaped portion within the guide tube and a corresponding at least one mating shaped portion in a region of the spindle nut;
 wherein during the motorized adjustment, the spindle nut runs along an axis of the spindle within the guide tube and is safeguarded against twisting with respect to the guide tube by the anti-twist mechanism;
 wherein the spindle drive portion and the spindle nut drive portion are coupled in a torque-transmitting manner by the anti-twist mechanism, wherein the at least one first shaped portion is or can be brought into torque-transmitting engagement with the corresponding at least one mating shaped portion;
 wherein the spindle nut is designed as a plastic injection-molded part; and
 wherein the spindle nut and the spindle nut-side shaped portion for anti-twist safeguarding are injection-molded into or onto the spindle nut tube by the plastic injection-molding process.

18. The spindle drive as claimed in claim 17, wherein the anti-twist mechanism and the corresponding torque-transmitting engagement are provided in both directions of rotation.

\* \* \* \* \*